United States Patent
Gheith

(10) Patent No.: US 8,108,616 B2
(45) Date of Patent: Jan. 31, 2012

(54) PROCESSING A DATA STREAM BY ACCESSING ONE OR MORE HARDWARE REGISTERS

(75) Inventor: Ahmed M. Gheith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 12/424,829

(22) Filed: Apr. 16, 2009

(65) Prior Publication Data

US 2010/0268888 A1    Oct. 21, 2010

(51) Int. Cl.
G06F 12/00     (2006.01)
(52) U.S. Cl. .......................... 711/137; 711/165
(58) Field of Classification Search .................. 711/137, 711/165, 168, E12.001
See application file for complete search history.

(56) References Cited

U.S. PATENT DOCUMENTS

2006/0179239 A1* 8/2006 Fluhr et al. .................... 711/137
2008/0320284 A1   12/2008 Grzywna et al.

OTHER PUBLICATIONS

IBM 7950 Harvest, Wikipedia, http://en.wikipedia.org/wiki/Harvest_(computer), 2011.
Kapasi et al., Programmable Stream Processors, IEEE Computer Society, pp. 54-62, Aug. 2003.
Ahn et al., Evaluating the Imagine Stream Architecture, Stanford University, CA, 2011.
Kapasi et al., The Imagine Stream Processor, Proceedings of the 2002 International Conference on Computer Design.
Das et al., Compiling for Stream Processing, PACT '06, Sep. 16-20, Seattle, Washington, ACM 2006.

* cited by examiner

Primary Examiner — Vu Le
(74) Attorney, Agent, or Firm — Libby Z. Toub

(57) ABSTRACT

Disclosed are a method, a system, and a program product for processing a data stream by accessing one or more hardware registers of a processor. In one or more embodiments, a first program instruction or subroutine can associate a hardware register of the processor with a data stream. With this association, the hardware register can be used as a stream head which can be used by multiple program instructions to access the data stream. In one or more embodiments, data from the data stream can be fetched automatically as needed and with one or more patterns which may include one or more start positions, one or more lengths, one or more strides, etc. to allow the cache to be populated with sufficient amounts of data to reduce memory latency and/or external memory bandwidth when executing an application which accesses the data stream through the one or more registers.

20 Claims, 4 Drawing Sheets

PROCESSING A DATA STREAM BY ACCESSING ONE OR MORE HARDWARE REGISTERS

This invention was made with United State Government support under Agreement No. HR0011-07-9-002, awarded by DARPA. THE GOVERNMENT HAS CERTAIN RIGHTS IN THE INVENTION.

BACKGROUND

1. Technical Field

The present invention generally relates to processing data streams. More specifically, the present invention relates to processing data streams that repetitively access hardware registers of a processor to process a data stream.

2. Description of the Related Art

Typically, streaming processors are coprocessors that interact with a host processor and are generally implemented as an application specific integrated circuit (ASIC). For example, the ASIC can include forty-eight arithmetic logic units (ALUs) that access a register file of the ASIC, and a streaming memory unit transfers streaming data between the register file of the ASIC and an off-chip memory. Using ASIC coprocessors, flexibility is sacrificed. For example, a computing model that is data-centric can work well for a traditional graphical processing unit (GPU) or digital signal processing (DSP) type applications; however, this computing model that is data-centric typically performs poorly for general purpose processing where data access can be more randomized or where memory access patterns are less predictable. Moreover, while an ASIC streaming coprocessor can use arrays, array dimension, array word length, stride, etc. are fixed when processing a specific data stream. Furthermore, there can be additional latency in an application executing on the host processor accessing data processed by the ASIC streaming coprocessor.

SUMMARY

Disclosed are a method, a system, and a program product for processing a data stream by accessing one or more hardware registers of a processor. In one or more embodiments, a first program instruction or subroutine can associate a hardware register of the processor with a data stream. With this association, the hardware register can be used as a stream head which can be used by multiple program instructions to access the data stream. For example, data from the data stream can be automatically pre-fetched and used to populate a cache of the processor such that the cache can be used in automatically populating the hardware register with data from the data stream to be used by subsequent program instructions. Since the cache and the register are automatically populated with data from the data stream, memory latency and/or external memory bandwidth can be reduced when executing an application that accesses the data stream through one or more hardware registers of the processor. In one or more embodiments, the data stream can be referred to as a pattern such that the data pattern can include a start, a length, a stride, etc. to describe how the data is fetched and used to populate the cache. Data from the data stream can be fetched automatically as needed to allow the cache to be populated with sufficient amounts of data to reduce memory latency and/or external memory bandwidth when executing the application which accesses the data stream through the one or more hardware registers.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION

Disclosed are a method, a system, and a program product for processing a data stream by accessing one or more hardware registers of a processor. In one or more embodiments, a first program instruction or subroutine can associate a hardware register of the processor with a data stream. With this association, the hardware register can be used as a stream head which can be used by multiple program instructions to access the data stream. For example, data from the data stream can be automatically pre-fetched and used to populate a cache of the processor such that the cache can be used in automatically populating the hardware register with data from the data stream to be used by subsequent program instructions. Since the cache and the register are automatically populated with data from the data stream, memory latency and/or external memory bandwidth can be reduced when executing an application that accesses the data stream through one or more hardware registers of the processor. In one or more embodiments, the data stream can be referred to as a pattern such that the data pattern can include a start, a length, a stride, etc. to describe how the data is fetched and used to populate the cache. Data from the data stream can be fetched automatically as needed to allow the cache to be populated with sufficient amounts of data to reduce memory latency and/or external memory bandwidth when executing the application which accesses the data stream through the one or more hardware registers.

Figure 1A:
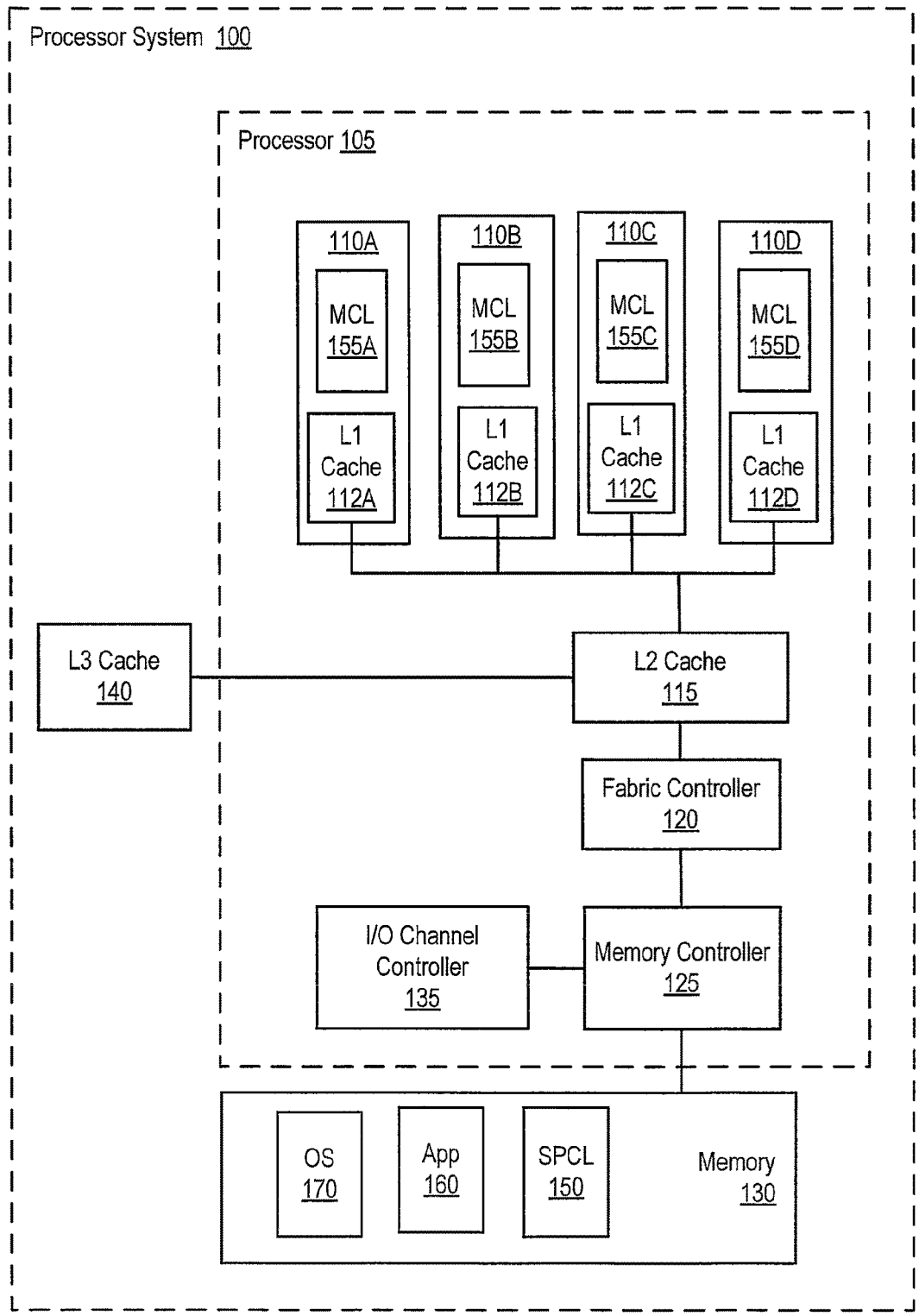
FIG. 1A illustrates a block diagram of a representation of a processor system, according to one or more embodiments.

Turning now to FIG. 1A, there is depicted a block diagram representation of a processor system, according to one or more embodiments. As is illustrated, a processor system 100 includes at least one chip-level multiprocessor (CMP) 105

(only one of which is illustrated in FIG. 1A), each of which includes one or more processors 110A-110D (e.g., cores). In one or more embodiments, CMP 105 can correspond to a node (or a portion of a node) of a high performance computing (HPC) cluster.

Processors 110A-110D can, for example, operate in a simultaneous multithreading (SMT) mode or a single thread (ST) mode. When processors 110A-110D operate in the SMT mode, processors 110A-110D can employ multiple separate instruction fetch address registers to store program counters for multiple threads. In one or more embodiments, each of processors 110A-110D include a respective first level (L1) cache memory 112A-112D that is coupled to a shared second level (L2) cache memory 115, which is coupled to a shared third level (L3) cache memory 140 and a fabric controller 120. In one or more embodiments, fabric controller 120 can support an interconnect fabric by which processor 105 can communicate with and share data with other processors.

As is illustrated, fabric controller 120 is coupled to a memory controller (e.g., included in a Northbridge) 125, which is coupled to a memory subsystem 130. For example, memory subsystem 130 can provide storage where data and/or processor instructions/code can be stored and/or retrieved. In one or more embodiments, memory subsystem 130 can include a random access memory and/or computer system memory such as DRAM, SRAM, EDO RAM, Rambus RAM, NVRAM, EPROM, EEPROM, flash memory, etc. Memory subsystem 130 can include other types of memory as well, or combinations thereof. Memory subsystem 130 includes an application appropriate amount of volatile and/or non-volatile memory. For example, memory subsystem 130 can include an amount of volatile and/or non-volatile memory to store utility or application 160 such that application 160 can be executed by processor 105.

In one or more embodiments, fabric controller 120 can be omitted and, in this case, the L2 cache 115 can be directly connected to memory controller 125. Fabric controller 120, when implemented, can facilitate communication between different CMPs and between processors 110A-110D and memory subsystem 130 and can function as in interface in this manner.

It should be appreciated that the various techniques disclosed herein are equally applicable to systems that employ separate L2 caches for each of processors 110A-110D, as well as systems that employ separate L2 and L3 caches for each of processors 110A-110D. Each of the L1, L2, and L3 caches can be combined instruction and data caches or correspond to separate instruction and data caches. As is shown in FIG. 1A, main memory controller 125 can also coupled to an I/O channel controller (e.g., included in a Southbridge) 135.

In one or more embodiments, I/O channel controller 135 can provide connectivity and control for one or more input devices and/or one or more output devices. In one example, the one or more input devices can include a pointing device (e.g., mouse) and/or a keyboard, among others. In another example, the one or more output devices can include a display, among others. Additionally, a multimedia drive (e.g., compact disk read/write (CDRW), digital video disk (DVD) drive, etc.) and/or an USB (universal serial bus) port can be coupled to I/O channel controller 135. The multimedia drive and the USB port enable insertion of a removable storage device (e.g., optical disk, "thumb" drive, etc.) on which data/instructions/code can be stored and/or from which data/instructions/code can be retrieved. Furthermore, I/O channel controller 135 can be coupled to various non-volatile memory such as a magnetic media, e.g., a hard drive, floppy drive, etc., where data/instructions/code can be stored and/or from where data/instructions/code can be retrieved. In one or more embodiments, I/O channel controller 135 can be coupled to a network interface (e.g., a wired network interface, a wireless network interface, etc.) that can be coupled to a network (e.g., a local area network, a wide area network, a public network such as an Internet, etc.).

In one or more embodiments, various features are completed/supported via software, firmware, microcode, code, and/or logic are implemented in processor 105 and/or memory 130. In one example, software/program instructions/code/logic (SPCL) 150 can be stored in memory 130 and executed by processor 105 to complete and/or implement various features described herein. In one or more embodiments, an operating system (OS) 170 (e.g., Microsoft Windows® OS, a trademark of Microsoft Corp, GNU®/Linux® OS, registered trademarks of the Free Software Foundation and The Linux Mark Institute, or Advanced Interactive Executive (AIX) OS, among others) can be used in conjunction with or include SPCL 150. In a second example, microcode and/or combinational logic can be used to implement various features. For instance, processors 110A-110D can include respective microcode and/or combinational logic (MCL) 155A-155D that can be used to implement various features described herein. In one or more embodiments, microcode, microinstructions, and/or microprogramming can include instructions that control a data path and/or control flow of processor 105.

In one example, microcode can be used to implement a processor instruction (e.g., a processor instruction of an instruction set architecture) of processor 105. For instance, when processor 105 executes the processor instruction, microcode is executed to implement the processor instruction. In other words, microcode can be referred to as firmware for processor 105 which can allow processor 105 to change behavior(s) of or implement new processor instructions available in an instruction set architecture (ISA) of processor 105. In one or more embodiments, hardware and/or hardware costs can be reduced using microcode to implement one or more processor instructions of an ISA of a processor.

Figure 1B:
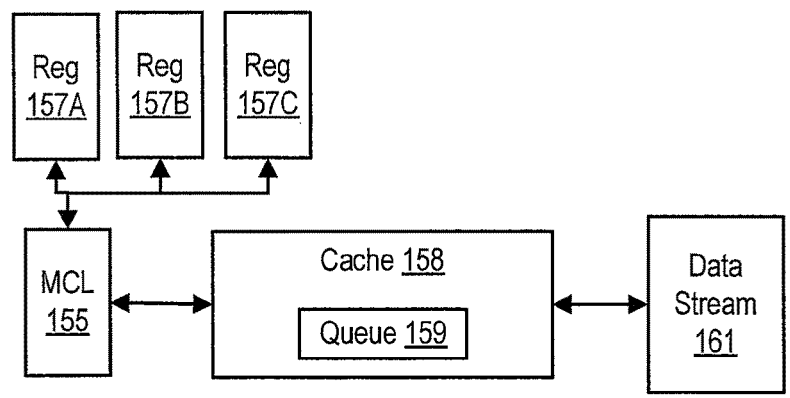
FIG. 1B illustrates a block diagram representation of hardware registers that produce data or consume data of a data stream through a cache, according to one or more embodiments.

Turning now to FIG. 1B, there is depicted a block diagram representation of hardware registers that produce data or consume data of a data stream through a cache, according to one or more embodiments. As illustrated, registers 157A-157C can be logically coupled to a cache 158 via MCL 155 (e.g., one of MCLs 155A-155D), and cache 158 can be coupled to data stream 161. As illustrated, cache 158 can include a queue 159. In one or more embodiments, MCL 155 can maintain a mapping between one or more of register 157A-157C and queue 159.

Figure 1C:
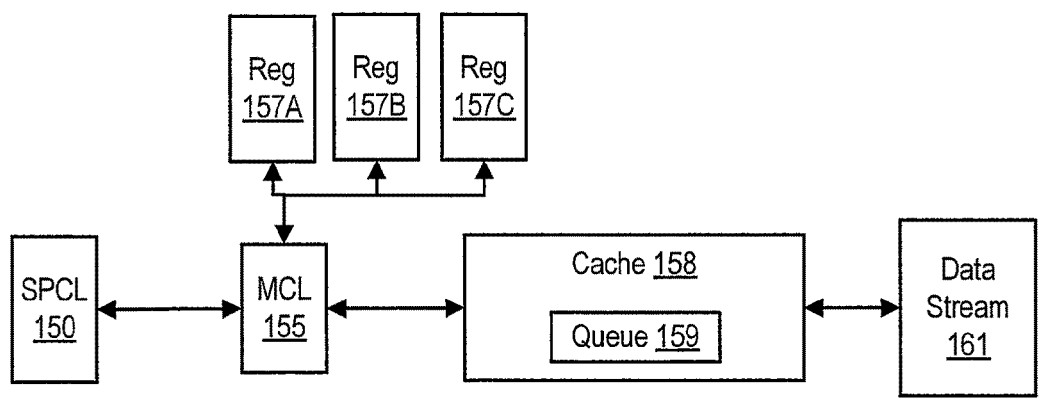
FIG. 1C illustrates a block diagram representation of hardware registers that produce data or consume data of a data stream through a cache, according to one or more embodiments.

Turning now to FIG. 1C, there is depicted a block diagram representation of hardware registers that produce data or consume data of a data stream through a cache, according to one or more embodiments. As illustrated, registers 157A-157C can be logically coupled to a cache 158 via MCL 155 which can be coupled to SPCL 150. In one or more embodiments, SPCL 150 can implement an application programming interface (API) that interfaces with and/or controls MCL 155. As illustrated, cache 158 that can include a queue 159.

In one or more embodiments, SPCL 150 implements an API that interfaces with MCL 155 or can implement one or more functionalities of MCL 155 if MCL 155 is absent or otherwise not available. In one example, SPCL 150 can implement at least a portion of a virtual machine that implements MCL 155 or can implement logic/code/functionality of MCL 155 such that when MCL 155 is absent or otherwise not available the API of SPCL 150 functions as though MCL 155 were present or available. This is further illustrated in FIG. 1D.

Figure 1D:
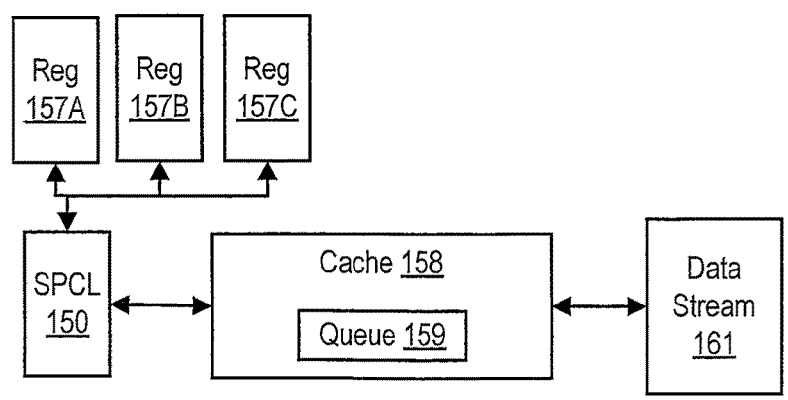
FIG. 1D illustrates a block diagram representation of hardware registers that produce data or consume data of a data stream through a cache, according to one or more embodiments.

Turning now to FIG. 1D, there is depicted a block diagram representation of hardware registers that produce data or consume data of a data stream through a cache, according to one or more embodiments. As illustrated, registers 157A-157C can be logically coupled to cache 158 via SPCL 150, and cache 158 can be coupled to data stream 161. As shown, cache 158 can include a queue 159. In one or more embodiments, SPCL 150 can implement at least a portion of a virtual machine and/or a virtual stream processor that implements MCL 155. In one or more embodiments, SPCL 150 can determine whether or not MCL 155 is available for use.

With reference to FIGS. 1A-1D, registers 157A-157C can be included in a processor such as a processor of 110A-110D. Cache 158 can be or be included in a cache of cache 115, cache 140, or a first level (L1) cache included in a processor such as one of caches 112A-112D. In one or more embodiments, data stream 161 can include data from and/or to memory 130, data from and/or to I/O channel controller 135, etc. For example, the data from and/or to I/O channel controller 135 can be received from a source and/or transmitted to a target external to processing system 100 which is coupled to processing system 100 via I/O channel controller 135. In one instance, processing system 100 can be coupled to measurement hardware via I/O channel controller 135. Measurement hardware can include sensors, transducers, a video acquisition device, an audio acquisition device, a machine vision device, an electric and/or magnetic field acquisition device, a data acquisition (DAQ) card, and/or actuators, among others. In a second instance, processing system 100 can be coupled to devices that output various fields and/or signals and/or devices that provide physical control of objects via I/O channel controller 135. In one or more embodiments, measurement hardware, devices that output various fields and/or signals, and/or devices that provide physical control of objects can be coupled to I/O channel controller 135 via a PCI (Peripheral Component Interconnect) bus, a PXI (PCI eXtensions for Instrumentation) bus, VXI (VME (VERSA-module Europe) eXtensions for Instrumentation) bus, a GPIB (General Purpose Interface Bus), a parallel port, and/or a serial port (e.g., RS-232 port, RS-485 port, UART port, universal serial bus port, IEEE 1394 port, Ethernet port, etc.), among others.

Figure 2A:
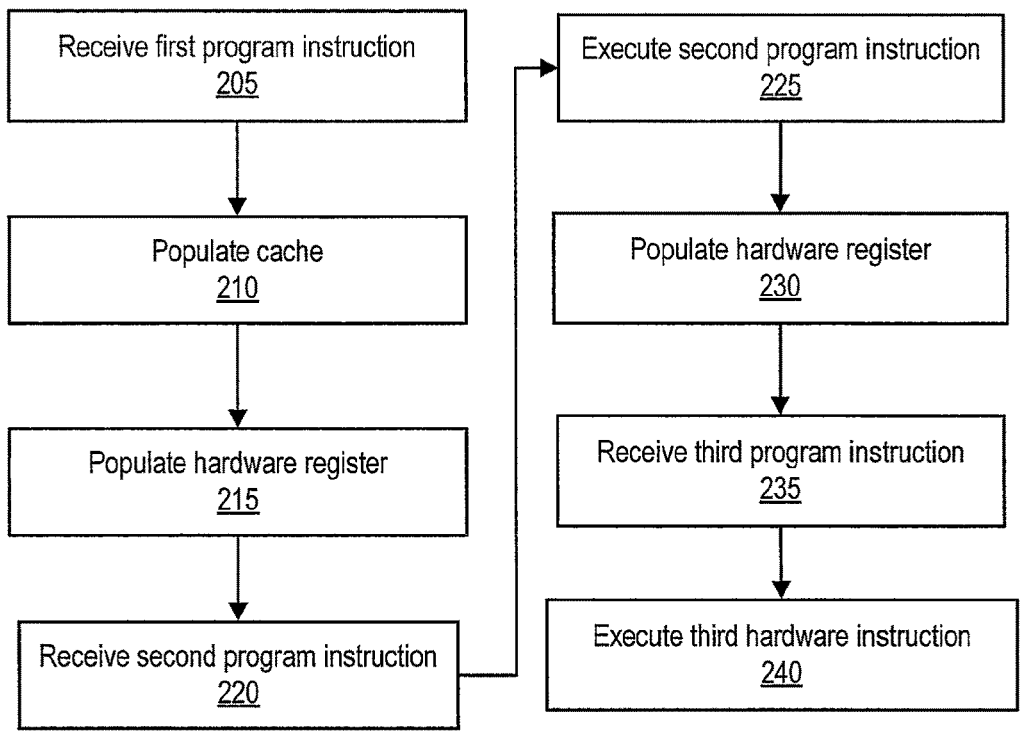
FIG. 2A illustrates a method for processing a data stream with a hardware register, according to one or more embodiments.

Turning now to FIG. 2A, a method for processing a data stream with a hardware register is illustrated, according to one or more embodiments. The method begins at block 205 where processor 105 receives a first program instruction. For example, the first program instruction can be from application 160. The first program instruction can be associated with a hardware register of processor 105, e.g., one of registers 157A-157C, and a data stream, e.g., data stream 161. In one example, the program instruction can include a processor instruction of processor 105 that accesses the hardware register for first data of the data stream. In a second example, the program instruction can include a call to an application programming interface (API) that associates a hardware register of processor 105 and a data stream. In one or more embodiments, the first program instruction can include a processor instruction from an ISA of processor 105. At block 210, MCL 155 can populate a cache of processor 105, e.g., cache 158, with at least a first portion of data from the data stream, where the first portion of the data stream includes the first data. In one example, MCL 155 can populate a queue implemented in the cache, e.g., queue 159.

At block 215, MCL 155 populates the hardware register with the first data. In one or more embodiments, the first program instruction can cause one or more of blocks 210 and 215 to be performed. For example, one or more of blocks 210 and 215 can be implemented in a subroutine of MCL 155. At block 220, processor 105 receives a second program instruction that accesses the hardware register. For example, the second program instruction can include a processor instruction from the ISA of processor 105 that accesses and/or uses data from the hardware register. In one or more embodiments, a processor instruction accessing a register (e.g., using the register as a source operand) can include "add", "subtract", "divide", "multiply", "test" (equality, zero, non-zero, etc.), "move", "and", "or", "xor", "shift", etc. At block 225, processor 105 executes the second program instruction.

At block 230, MCL 155 populates the hardware register with second data from the first portion of the data. At block 235, processor 105 receives a third program instruction, where the third program instruction accesses the hardware register. For example, the third program instruction can include a processor instruction from the ISA of processor 105 that accesses and/or uses data from the hardware register. At block 240, processor 105 executes the third program instruction. In one or more embodiments, two or more of the first, second, and third program instructions are included in a same thread and/or application (e.g., application 160). In the fashion of the method of FIG. 2A, the hardware register is automatically populated with successive data from the data stream which is available for successive program instructions of the thread or application which is illustrated in more detail in FIG. 2B.

Figure 2B:
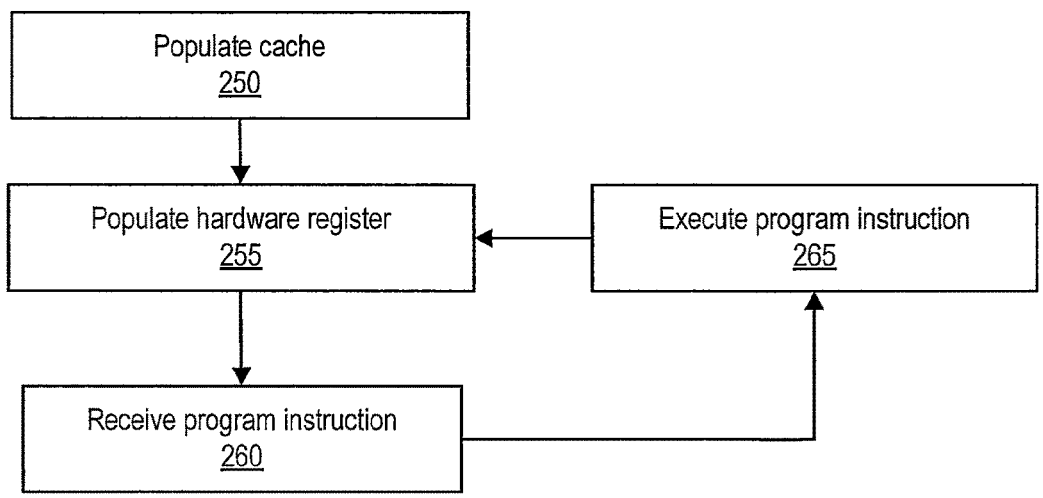
FIG. 2B illustrates a method for processing a data stream with a hardware register where the hardware register is automatically populated with data from the data stream, according to one or more embodiments.

Turning now to FIG. 2B, a method for processing a data stream with a hardware register is illustrated, according to one or more embodiments. The method begins at block 250 where MCL 155 populates cache 158 with data from the data stream. In one example, MCL 155 can populate queue 159 with the data from the data stream. At block 255, MCL 155 populates the hardware register with data of the data stream from cache 158. In one or more embodiments, MCL 155 populates the hardware register with data of the data stream from queue 159 of cache 158. At block 260, processor 105 receives a program instruction that accesses the hardware register. For example, the program instruction can include a processor instruction from the ISA of processor 105 that accesses and/or uses data from the hardware register. At block 265, processor 105 executes the second program instruction and the method proceeds to block 255. In one or more embodiments, block 255-265 can be repeated a number of times.

As illustrated in the method of FIG. 2B, the hardware register is automatically populated with successive data from the data stream which is available for successive program instructions. In other words, the hardware register can be referred to as a stream head which can be used by multiple program instructions in a sequence. Moreover, since the cache and the register are automatically populated with data from the data stream, memory latency and/or external memory bandwidth can be reduced when executing application 160 that accesses a data stream through one or more hardware registers of a processor. In one or more embodiments, the data stream can be referred to as a pattern such that the data pattern may include a start, a length, a stride, etc. to describe how the data is fetched and used to populate the cache. Data from the data stream can be fetched automatically as needed to allow the cache to be populated with sufficient amounts of data to reduce memory latency and/or external memory bandwidth when executing application 160 which accesses the data stream through one or more hardware registers.

As FIGS. 2A and 2B are described above with reference to MCL 155, one or more of MCL 155A-155D can be used where MCL 155 is referenced. In one or more embodiments, SPCL 150 could be used were MCL 155 is referenced or SPCL 150 can interface with and/or control MCL 155. In one example, SPCL 150 can provide an API through a library to which application 160 can be linked. In one or more embodiments, application 160 and SPCL 150 can be combined, e.g., at compile and/or assemble time. For example, application 160 can be assembled and/or compiled in such a way that SPCL 150 is integrated into application 160 using macros of a macro assembler and/or pre-processing instructions of a compiler to use macros and/or to call one or more subroutines of an API of SPCL 150 when the hardware register would have been accessed by application 160.

Figure 3A:
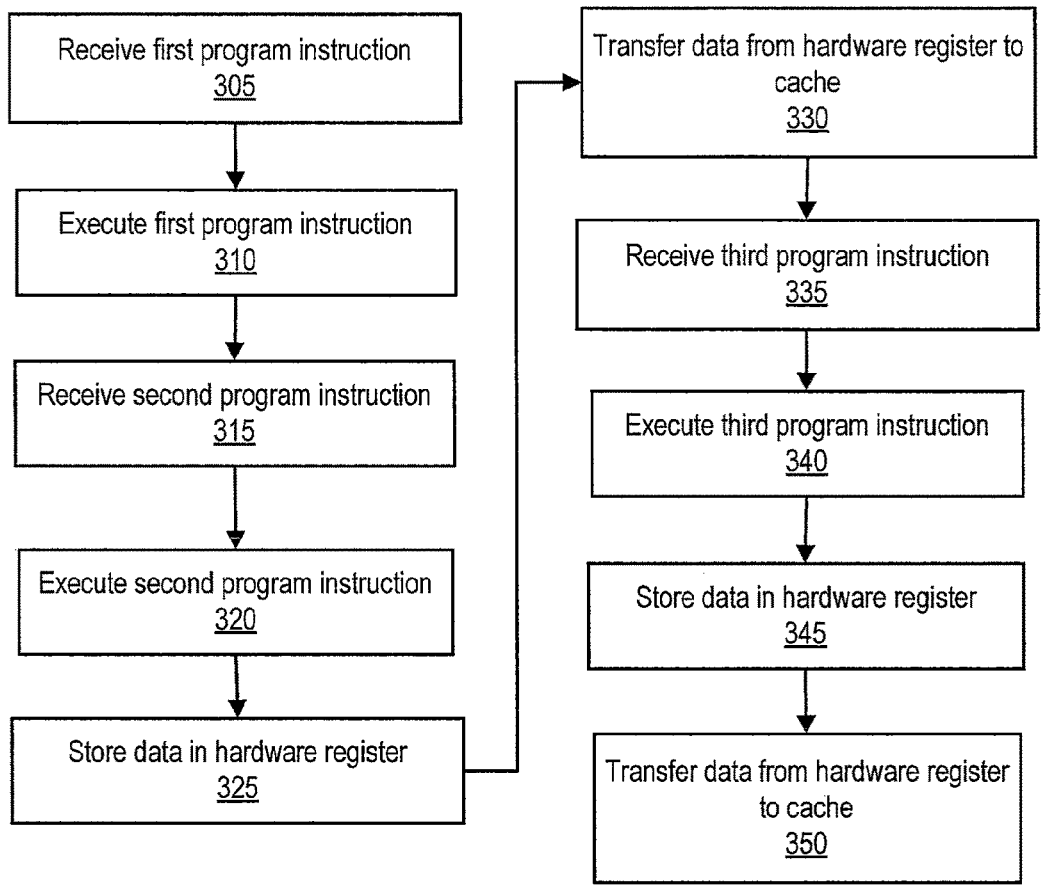
FIG. 3A illustrates a method for producing a data stream with a hardware register, according to one or more embodiments.

Turning now to FIG. 3A, a method for producing a data stream with a hardware register is illustrated, according to one or more embodiments. The method begins at block 305 where processor 105 receives a first program instruction. For example, the first program instruction can be from application 160. For instance, the first program instruction can include a processor instruction of the ISA of processor 105. At block 310, processor 105 executes the first program instruction. When the first program instruction is executed, an associated between a cache of processor 105, e.g., cache 158, and a hardware register of processor 105, e.g., one of registers 157A-157C, can be created. In one or more embodiments, the data stored in the hardware register is transferred (e.g., copied) to the cache of processor 105. For example, the data stored in the hardware register can be transferred to the cache when a program instruction from a first thread uses the hardware register to store data. In this fashion, if a program instruction from a second thread uses the hardware register to store data, that data will not be transferred to the cache. In one or more embodiments, data stored in the hardware register is transferred (e.g., copied) to a queue implemented in the cache of processor 105.

At block 315, processor 105 receives a second program instruction, where the second program instruction stores data in the hardware register. At block 320, processor 105 executes the second program instruction, and processor 105 stores the data in the hardware register, at block 325. At block 330, MCL 155 transfers (e.g., copies) the data stored in the hardware register to the cache of processor 105. In one example, MCL 155 can populate a queue implemented in the cache, e.g., queue 159, with the data stored in the hardware register. In one or more embodiments, the data stored in the hardware register can be transferred to the cache when a program instruction from a first thread uses the hardware register to store data. In this fashion, if a program instruction from a second thread uses the hardware register to store data, that data will not be transferred to the cache.

At block 335, processor 105 receives a third program instruction, where the third program instruction stores data in the hardware register. At block 340, processor 105 executes the second program instruction, and processor 105 stores the data in the hardware register, at block 345. At block 350, MCL 155A transfers (e.g., copies) the data stored in the hardware register to the cache of processor 105. In the fashion of the method of FIG. 3A, the cache is automatically populated with successive data stored in the hardware register which is illustrated in more detail in FIG. 3B.

Figure 3B:
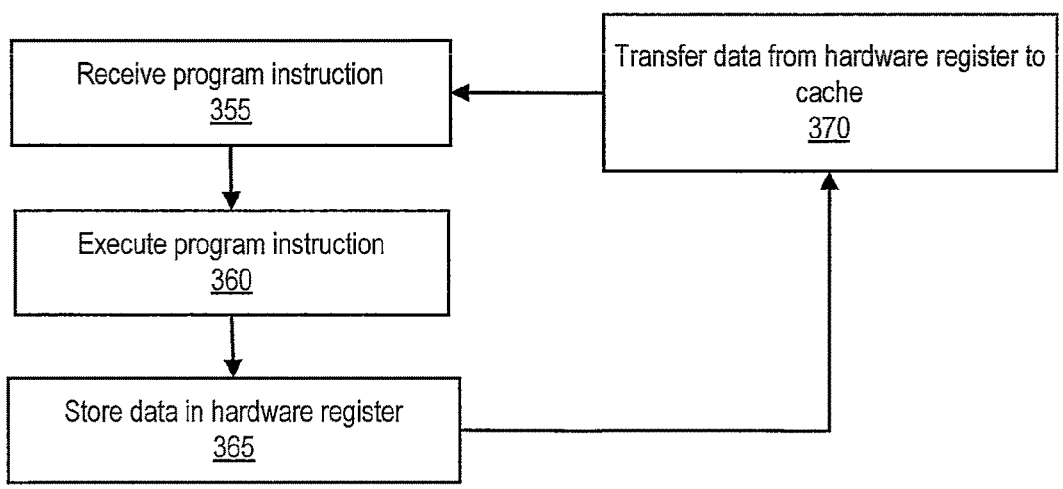
FIG. 3B illustrates a method for producing a data stream with a hardware register where the cache is automatically populated with data from the hardware register, according to one or more embodiments.

Turning now to FIG. 3B, a method for producing a data stream with a hardware register is illustrated, according to one or more embodiments. The method begins at block 355 where processor 105 receives a program instruction. For example, the program instruction can be from application 160. For instance, the program instruction can include a processor instruction of the ISA of processor 105. At block 360, processor 105 executes the program instruction, where the program instruction causes processor 105 to store data in the hardware register at block 365. At block 370, MCL 155 transfers (e.g., copies) the data stored in the hardware register to cache 158, and the method proceeds to block 355. As illustrated in FIG. 3B, the cache is automatically populated with successive data stored in the hardware register. In one or more embodiments, block 355-370 can be repeated a number of times.

As FIGS. 3A and 3B are described above with reference to MCL 155, one or more of MCL 155A-155D can be used where MCL 155 is referenced. In one or more embodiments, SPCL 150 could be used were MCL 155 is referenced or SPCL 150 can interface with and/or control MCL 155. In one example, SPCL 150 can provide an API through a library to which application 160 can be linked. In one or more embodiments, application 160 and SPCL 150 can be combined, e.g., at compile and/or assemble time. For example, application 160 can be assembled and/or compiled in such a way that SPCL 150 is integrated into application 160 using macros of a macro assembler and/or pre-processing instructions of a compiler to use macros and/or to call one or more subroutines of an API of SPCL 150 when the hardware register would have been accessed by application 160.

Although the methods illustrated in FIGS. 2A-3B describe one hardware register, multiple hardware registers can be used instead of the one hardware register, according to one or more embodiments. In one example, the data stream can include frames, where each frame may include a length that exceeds a length of the hardware register. Accordingly, multiple hardware register can be populated such that each frame can be available via the multiple registers for a sequence of program instructions of application 160. In a second example, one or more of processors 110A-110D can be superscalar processors, and multiple hardware registers can be automatically populated with data from the data stream. Multiple program instructions from application 160 can operate simultaneously on different portions of the data stream via the multiple registers. In one or more instances, one or more of processors 110A-110D can operate in single instruction multiple data (SIMD) mode and/or multiple instructions multiple data (MIMD) mode in executing application 160 to simultaneously process different portions of the data stream via the multiple registers. Although the methods illustrated in FIGS. 2A-3B may be described with reference to components shown in FIGS. 1A-1D, it should be understood that this is merely for convenience and alternative components and/or configurations thereof can be employed in one or more implementations.

In one or more embodiments, application 160 can use and/or interface with MCL 155 and/or SPCL 150 in processing and/or producing various data streams. In one example, the data stream may be in accordance with a Motion Picture Editors Guild (MPEG) standard (or proposed standard) and/or one or more audio and/or video codecs. In a second example, the data stream may include various signals. In one instance, a discrete Fourier transform may be performed on the signal. In a third example, the data stream can include biometric data. For instance, the biometric data can include facial and/or audio information of one or more human beings' data, and application 160 can be used to determine patterns to identify and/or isolate one or more human beings and/or words (written or spoken) included in the data stream.

In one or more embodiments, application 160 can use the API of SPCL 150 to dynamically configure access patterns of the data stream. For example, the data stream can include audio and video data, and application 160 can use the API of SPCL 150 to dynamically adjust to processing audio portions and video portions of the data stream. For instance, the data stream can include a first data structure that includes audio data of the data stream and include a second data structure that includes video data of the data stream. The data embodied in the first data structure can be made available through a first set of hardware registers (e.g., the first two hardware registers) of a processor, and the data embodied in the second data structure can be made available through a second set of hardware registers (e.g., the next three hardware registers) of the processor.

In one or more embodiments, the data stream can be dependent upon a data structure. For example, the data structure can include a linked list, a binary tree, a multi-branch tree, an indexed hash table, etc., and the methods described above can automatically access the data structure without an application (e.g., application 160) accessing the data structure directly. In one or more embodiments, the data stream can be dependent upon a data processing scheme and/or method. In one example, the data stream can include a compressed file. For instance, the methods described above can access the compressed file and automatically present uncompressed portions of the data of the compressed file through one or more hardware registers to an application. In another example, data stored in one or more hardware registers can be compressed when the data is transferred to the cache or when the data is transferred from the cache to the data stream.

In the flow charts above, one or more of the methods and/or processes are embodied in a computer readable medium including computer readable code such that a series of steps are performed when the computer readable code is executed by a processor. In one or more implementations, certain processes of the methods and/or processes are combined, performed simultaneously, concurrently (e.g., scheduled quickly enough in time to appear simultaneous to a person), or in a different order, or perhaps omitted, without deviating from the spirit and scope of the invention. Thus, while the method(s) and/or process(es) are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, process, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", and/or "system." Furthermore, the present invention may take the form of an article of manufacture having a computer program product with a computer-usable storage medium having computer-executable program instructions/code embodied in or on the medium.

As will be further appreciated, the method(s) and/or process(es) in embodiments of the present invention may be implemented using any combination of software, firmware, microcode, and/or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, EPROMs, EEPROMs, etc., thereby making an article of manufacture, in one or more embodiments. The medium may be electronic, magnetic, optical, electromagnetic, infrared, or semiconductor system (or apparatus or device) or a propagation medium. Further, the medium may be any apparatus that may include, store, communicate, propagate, or transport the program for use by or in connection with the execution system, apparatus, or device. The method(s) and/or process(es) disclosed herein may be practiced by combining one or more machine-readable storage devices including the code/logic according to the described embodiment(s) with appropriate processing hardware to execute and/or implement the code/logic included therein. In general, the term computer, computer system, or data processing system can be broadly defined to encompass any device having a processor (or processing unit) which executes instructions/code from a memory medium.

While the invention has been described with reference to exemplary embodiments, it will be understood by those skilled in the art that various changes may be made and equivalents may be substituted for elements thereof without departing from the scope of the invention. In addition, modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, use of the terms first, second, etc. can denote an order if specified, or the terms first, second, etc. can be used to distinguish one element from another without an ordered imposed.

What is claimed is:

1. A method for operating a processing system, comprising:
    executing a first program instruction that associates a hardware register of a processor with a data stream;
    populating a cache of the processor with a first portion of data of the data stream;
    populating the hardware register with first data of the first portion of data;
    receiving a second program instruction that accesses the hardware register;
    executing the second program instruction;
    after said executing the second program instruction, automatically populating the hardware register with second data of the first portion of data;
    receiving a third program instruction that accesses the hardware register; and
    executing the third program instruction.

2. The method of claim 1, further comprising:
    automatically populating the hardware register with subsequent data from the cache, wherein the data from the cache is subsequent data of the data stream;
    executing a subsequent program instruction, wherein the subsequent program instruction is a program instruction that is subsequent to a program instruction that has been executed; and
    repeating, a number of times, said automatically populating the hardware register with subsequent data from the cache and said executing the subsequent program instruction.

3. The method of claim 1, wherein the first program instruction includes a processor instruction of an instruction set architecture (ISA) of the processor, wherein executing the processor instruction causes the processing system to perform said populating the cache of the processor with the first portion of data of the data stream and said populating the hardware register with first data of the first portion of data.

4. The method of claim 1, wherein the first program instruction and the second program instruction are included in a same thread.

5. The method of claim 1, farther comprising:
executing a subroutine executable by the processing system to perform said populating the cache of the processor with the first portion of data of the data stream, said populating the hardware register with the first data of the first portion of data, and said automatically populating the hardware register with the second data of the first portion of data.

6. The method of claim 5, wherein the subroutine is implemented with microcode and/or combinational logic.

7. The method of claim 5, wherein said executing the first program instruction that associates the hardware register of the processor with a data stream causes said executing the subroutine.

8. A computer program product, comprising:
a computer-readable medium; and
program instructions stored on said computer-readable medium that when executed on a processing system, cause the processing system to perform the functions of:
executing a first program instruction that associates a hardware register of a processor with a data stream;
populating a cache of the processor with a first portion of data of the data stream;
populating the hardware register with first data of the first portion of data;
receiving a second program instruction that accesses the hardware register;
executing the second program instruction;
after said executing the second program instruction, automatically populating the hardware register with second data of the first portion of data;
receiving a third program instruction that accesses the hardware register; and
executing the third program instruction.

9. The computer program product of claim 8, wherein the program instructions stored on said computer-readable medium that when executed on a processing system, cause the processing system to further perform the functions of:
automatically populating the hardware register with subsequent data from the cache, wherein the data from the cache is subsequent data of the data stream;
executing a subsequent program instruction, wherein the subsequent program instruction is a program instruction that is subsequent to a program instruction that has been executed; and
repeating, a number of times, said automatically populating the hardware register with subsequent data from the cache and said executing the subsequent program instruction.

10. The computer program product of claim 9, wherein the first program instruction includes a processor instruction of an instruction set architecture (ISA) of the processor, wherein executing the processor instruction causes the processing system to perform said populating the cache of the processor with the first portion of data of the data stream and said populating the hardware register with first data of the first portion of data.

11. The computer program product of claim 8, wherein the first program instruction and the second program instruction are included in a same thread.

12. The computer program product of claim 8, wherein the program instructions stored on said computer-readable medium that when executed on a processing system, cause the processing system to further perform the function of:
executing a subroutine executable by the processing system to perform said populating the cache of the processor with the first portion of data of the data stream, said populating the hardware register with the first data of the first portion of data, and said automatically populating the hardware register with the second data of the first portion of data.

13. The computer program product of claim 12, wherein the subroutine is implemented with microcode and/or combinational logic.

14. The computer program product of claim 12, wherein said receiving the first program instruction that associates the hardware register of the processor with a data stream causes said executing the subroutine.

15. A processor system, comprising:
at least one processor including a cache;
wherein the at least one processor provides logic for performing the functions of:
executing a first program instruction that associates a hardware register of a processor with a data stream;
populating the cache of the processor with a first portion of data of the data stream;
populating the hardware register with first data of the first portion of data;
receiving a second program instruction that accesses the hardware register;
executing the second program instruction;
after said executing the second program instruction, automatically populating the hardware register with second data of the first portion of data;
receiving a third program instruction that accesses the hardware register; and
executing the third program instruction.

16. The processor system of claim 15,
wherein the at least one processor includes an I/O channel controller;
wherein the at least one processor provides logic for performing the function of:
receiving the data stream from a component external to the at least one processor through the I/O channel controller.

17. The processor system of claim 15, further comprising:
a memory coupled to the processor;
wherein the memory includes the first program instruction and the second program instruction; and
wherein the first program instruction and the second program instruction are included in a same thread.

18. The processor system of claim 15, wherein the at least one processor provides logic for performing the functions of:
executing a subroutine executable by the processing system to perform said populating the cache of the processor with the first portion of data of the data stream, said populating the hardware register with the first data of the first portion of data, and said automatically populating the hardware register with the second data of the first portion of data.

19. The processor system of claim 18, wherein the subroutine is implemented with microcode, combinational logic, or a combination of microcode and combinational logic.

20. The processor system of claim 18, wherein said receiving the first program instruction that associates the hardware register of the processor with a data stream causes said executing the subroutine.

* * * * *